US010877468B2

(12) United States Patent
Iseli et al.

(10) Patent No.: US 10,877,468 B2
(45) Date of Patent: Dec. 29, 2020

(54) SELF-MONITORING MANUFACTURING SYSTEM

(71) Applicant: HEXAGON TECHNOLOGY CENTER GMBH, Heerbrugg (CH)

(72) Inventors: Claudio Iseli, Au (CH); Thomas Ammer, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 273 days.

(21) Appl. No.: 15/834,971

(22) Filed: Dec. 7, 2017

(65) Prior Publication Data
US 2018/0173209 A1   Jun. 21, 2018

(30) Foreign Application Priority Data

Dec. 20, 2016 (EP) .................................. 16205291

(51) Int. Cl.
*G06F 19/00* (2018.01)
*G05B 19/418* (2006.01)
*G01B 21/04* (2006.01)

(52) U.S. Cl.
CPC ....... *G05B 19/41875* (2013.01); *G01B 21/04* (2013.01); *G05B 2219/32177* (2013.01); *G05B 2219/32189* (2013.01); *G05B 2219/32192* (2013.01); *G05B 2219/32197* (2013.01);
(Continued)

(58) Field of Classification Search
CPC .... G05B 19/41875; G05B 2219/32177; G05B 2219/37499; G05B 2219/37533; G05B 2219/32189; G05B 2219/32192; G05B 2219/32197; G01B 21/04; Y02P 90/14; Y02P 90/22; Y02P 90/28
See application file for complete search history.

(56) References Cited

U.S. PATENT DOCUMENTS 5,844,801 A * 12/1998 Kodama ............. B62D 65/005
700/110
7,672,500 B2    3/2010 Albeck et al.
2003/0033041 A1  2/2003 Richey
(Continued)

FOREIGN PATENT DOCUMENTS

DE    195 44 240 A1    6/1996
DE    102 42 811 A1    3/2004

OTHER PUBLICATIONS

Extended European Search Report dated Sep. 14, 2017 as received in Application No. 16205291.4.

*Primary Examiner* — Zhipeng Wang
(74) *Attorney, Agent, or Firm* — Maschoff Brennan

(57) ABSTRACT

A Self-monitoring manufacturing system adapted to produce at least one object. The system includes at least a first processing facility adapted to perform a respective first processing step with the object, and a production control unit, wherein the production data comprises nominal pre-processing object data. A production monitoring unit for checking a pre-processing object state of the object is arranged, such unit being adapted to obtain actual property data of the object in-line of the production in-advance of applying the first processing step, to generate deviation data by comparing the actual property data with the production data for the first processing step, and to provide the deviation data for performing the first production step with the first processing facility in deviation-adjusted manner.

17 Claims, 3 Drawing Sheets

(52) U.S. Cl.
CPC ........... *G05B 2219/37499* (2013.01); *G05B 2219/37533* (2013.01); *Y02P 90/02* (2015.11)

(56) References Cited

U.S. PATENT DOCUMENTS

| | | | |
|---|---|---|---|
| 2012/0130525 A1* | 5/2012 | Tsai | G05B 19/41875 700/108 |
| 2014/0358481 A1* | 12/2014 | Kumagae | G05B 23/0275 702/185 |
| 2015/0248755 A1* | 9/2015 | Vagman | G01N 21/8851 382/103 |
| 2015/0266183 A1* | 9/2015 | Alifragkis | B25J 9/1692 700/254 |
| 2016/0202691 A1 | 7/2016 | Pettersson et al. | |
| 2016/0320771 A1* | 11/2016 | Huang | B29C 67/00 |
| 2017/0148153 A1* | 5/2017 | Nakao | G06T 7/0004 |
| 2017/0310935 A1* | 10/2017 | Sinclair | G06T 19/20 |

\* cited by examiner

SELF-MONITORING MANUFACTURING SYSTEM

CROSS-REFERENCE TO RELATED APPLICATIONS

This application claims priority to European Patent Application No. 16205291 filed on Dec. 20, 2016. The foregoing patent application are incorporated herein by reference.

FIELD OF THE INVENTION

Background

The present invention pertains to the field of quality assurance for production processes. More specifically, the present invention relates to a systems and methods for controlling a production facility based on measurements of samples and for compensating (systematic) errors occurring in the production process.

It is common practice during the industrial production of goods such as a car to measure features and properties of its different components. These measurements can be carried out in special measurement cells by means of either contact or non contact measuring gauges, for example based on laser or photogrammetric principles. Such a procedure, for instance, is disclosed in DE 195 44 240 A1.

U.S. Pat. No. 7,672,500 discloses a method for monitoring and visualizing the output of a production process, whose output materials or items are inspected by one or more inspection units. The inspection units scan or otherwise inspect each of a series of items or material being produced by a production process, and an image is generated representing each of the inspected items, wherein differences between the items can be visually coded.

The purpose of such methods is to determine possible errors of the measured object during product development, launch or during production. Disadvantageously though, in the measurement process, there can occur various additional errors, that prevent or complicate the determination of the errors of the object. This is especially the case if a high precision detection of errors is needed.

The quantities produced in the controlled production process can lie in a range between one piece production and mass production. The parts are produced in a production facility which can incorporate a broad scale of different manufacturing techniques and technologies. Depending on the specific manufacturing technique the installation set-up of the facility can vary. For example, the production facility can comprise a CNC machine—including programming means as well as electronic controller means—if the parts are to be produced by milling or turning.

The parts to be produced are specified by nominal data in a drawing and/or a CAD model that defines theoretical dimensions of the part in combination with appropriate tolerances. The tolerances define the accepted deviations between the specified theoretical dimensions of the nominal data and the real dimensions of a produced part.

The manufacturing processes referred to also include a quality control step wherein measures are taken to ensure the desired quality of the produced parts, i.e. to ensure that the percentage of "good parts" does not fall below a defined minimum. The quality control step consists of two sub-steps:

a measurement step to detect the quality of the produced parts by measuring appropriate quantities with an appropriate measurement facility; and a correction step to improve the production quality in case that the results of the measurement step show unsatisfying values (e.g. not enough "good parts").

Today, in manufacturing processes of the kind described above, the measurement facility that detects the quality of the produced parts can be e.g. a coordinate measurement machine CMM or an articulated arm (e.g. a measuring roboter arm). With this measurement equipment the "good parts" are detected by measuring one or more defined part dimensions (measurement step).

If the measurements show that the deviations between the measured part dimensions and the theoretical values defined in the nominal data exceed the accepted tolerances, appropriate parameter values of the production facility are amended to compensate these production errors. In the above example of a CNC machine this could be the case e.g. if a milling tool changes its characteristics due to wear.

This parameter value amendment, however, has the strong disadvantage that it needs good knowledge about the general installation set-up of the facility, the current constitution of the facility and about the cause of the production errors. This requires highly skilled personal, and moreover—since the production error causes often are not exactly known—in many cases a try-and-error approach has to be performed which is time consuming and costly.

Therefore, a possibility to compensate the production errors without changing the parameter values of the production facility—i.e. wherein the production facility can be treated as a "black box"—would be highly advantageous.

SUMMARY

It is therefore an object of some embodiments of the present invention to provide an improved method and an improved system for controlling a production process of an object in a production facility or production line.

It is a particular object of some embodiments to provide such a method and such a system wherein modifications in a production line can be avoided or at least be reduced.

It is a further object of some embodiments to provide an error compensation for controlling a production process in a production process without having to perform structural amendments in the production facility.

These objects are achieved by realising the features of the independent claims. Features which further develop the invention in an alternative or advantageous manner are described in the dependent patent claims.

Some embodiments of the invention relate to a self-monitoring manufacturing system adapted to produce at least one object, in particular a series of objects, by means of a production line. The production line comprises at least a first processing facility which is adapted to perform a respective first processing step with the object and a production control unit having means for storing and/or obtaining production data for the first processing step and being adapted to control the processing step based on the production data, wherein the production data comprises nominal pre-processing object data, in particular relating to an in-advance processing step. The in-advance processing step may be performed to the object before the object is introduced in the production line, e.g. the object can be processed by a pre-processing machine which may be not part of the production line.

The processing facility of the line thus can be controlled to apply a manufacturing step, e.g. drilling or milling, to the object based on known processing data. The processing data for controlling the first processing step can preferably be based on said nominal pre-processing object data so that processing is performed at correct positions and orientation relative to the object. E.g. the object is a raw piece of (theoretically) known shape and dimensions. However, it typically occurs that an object to be processed differs from nominal object data regarding dimensions and/or shape. By means of the present invention, the processing step initially defined for the processing facility can be adapted in a way so that particular deviations of the object are compensated. In particular, an object which comprises dimensional deviations from nominal values can be processed so that after the processing with the processing facility such deviations are compensated. For example, if one edge of the raw object is longer than it should be, such edge can be shortened by the processing facility to meet nominal post-processing requirements (e.g. dimension and/or shape).

The self-monitoring manufacturing system according to some embodiments of the invention comprise a production monitoring unit for, in particular periodically, checking a pre-processing object state of the object. The production monitoring unit is adapted to obtain actual property data of the object in-line of the production in-advance of applying the first processing step, to generate deviation data by comparing the actual property data with the production data for the first processing step, in particular with the pre-processing object data, and to provide the deviation data for performing the first production step with the first processing facility in deviation-adjusted manner.

Original production data for the first processing step is adaptable for adapted controlling of the first processing facility based on the deviation data and the first processing facility is controllable based on the adapted production data for the first processing step in a manner such that the deviation between the actual property data and the nominal pre-processing object data is compensated so that thereof-expected deviation between actual property data relating to the object after performing the original first processing step and original production data for the first processing step is reduced.

Above approach is of the type of an in-line approach, i.e. there is one chain of inspecting and processing the object, wherein inspection of the object is performed in advance of respective processing a data which is gathered by inspecting the object is used for respectively adjusting the processing step. In particular, the object is placed on a belt and inspection of the object is performed while moving the object by means of the belt. The production monitoring unit can be designed accordingly for proving such moved inspection.

According to an embodiment of the invention, the production monitoring unit comprises a coordinate measuring machine which comprises at least a support structure and a measuring probe.

In particular, the support structure comprises at least one structural segment, wherein a proximal end of the support structure is mounted pivotably about a base axis, the measuring probe is arranged on a distal end of the support structure, and the coordinate measuring machine comprises an angle measuring system for determining pivot angles of the at least one structural segment, and/or rotation angles of the measuring probe.

The coordinate measuring machine may comprise at least two basically parallel rotational axes, in particular wherein structural segments of the support structure are rotatable around the axes, in particular wherein the coordinate measuring machine comprises a translational axis arranged basically collinear with one of the rotational axes, in particular wherein the rotational axes are aligned basically parallel to the gravitational field.

The coordinate measuring machine can thus be embodied as a Selective-Compliance-Articulated-Robot-Arm-Type (SCARA-Type) measuring machine, in particular parallel SCARA-Type measuring machine.

A SCARA-based CMM can be moved faster than a comparable Cartesian CMM. A single pedestal mount requires a much smaller footprint and provides an easy and flexible form of mounting the whole CMM. Such SCARA-CMM can be based on a serial architecture (a first "carries" all other motors). By means of the typical parallel-axis joint layout the supporting structure is basically rigid in z-direction.

According to an embodiment of the invention, the coordinate measuring machine is arranged and controlled so that the object production state is periodically checked by measuring particular measuring points of the object by in-line approaching the measuring probe to the object during production of the object by the production line.

For instance, after pre-processing the object or after placing the object on the production line and before processing with the first processing facility the coordinate measuring machine is controlled to approach the object and to acquire measuring data which provides information about an actual object state. Controlling of the CMM can be realised so that measurements can be taken while moving the object in the production line, e.g. on a conveying belt.

In particular the object may be placed separated e.g. from a conveying belt and measurements are taken in an "uncoupled" object-position. The object may be carried by the monitoring unit and positioned or moved so that respective measurements can be carried out with a measuring probe.

Furthermore, the production monitoring unit can be arranged (at least basically) structurally and dynamically decoupled from the processing facility in order to prevent from negative influences due to vibrations or increasing temperatures. In particular, a base of the production monitoring unit can be arranged at a ceiling of a manufacturing site. A big advantage of such design is the possibility to measure the object by reaching into the working volume of the production line from above. Moreover, required space for such embodiment can be optimised as the whole CMM can be carried and mounted at the ceiling.

A measuring probe attached to the CMM can be designed to gather positional (coordinate) information and/or to determine functional information, like roughness of the surface, hardness of the material and/or temperature of the object. The probe may be realised by a touch-trigger or optical probe, by a temperature sensor or by a tactile or optical roughness sensing unit and/or by a non-destructive sensor like an eddy current sensor, ultra sonic sensor to detect defects or related properties at or below the surface.

Accordingly, the actual property data can comprise dimensional data, in particular coordinates of the measuring points, and/or functional property data, in particular roughness data, hardness data and/or temperature data. In particular, functional property data comprises defect information regarding e.g. cracks, scratches, porosity changes, delamination, coating errors or flaws and/or properties below the surface regarding cracks, homogeneity, porosity or delamination can be detected.

The production data which is provided to the system may comprise a first object model which represents a nominal state of the object for the first processing step according to the nominal pre-processing object data and a second object model which represents a nominal state of the object after applying the first processing step. Thus, there would be a model (2D or 3D) of the object before and after applying the first processing step. The models represent respectively desired states of the object. At least one of the models would be represented by dimensional values relating to particular parts of the object, e.g. lengths of edges.

According to an embodiment of the invention, the production line comprises a further production facility which is adapted to perform the in-advance processing step with the object, wherein the further production facility is controllable by the production control unit, in particular based on the pre-processing object data. Such further production facility may for example represent an initial processing machine of the production line which is configured and designed to perform a first adaptation of the object, e.g. the object may be prepared of the next step.

Alternatively or additionally, the production line can comprise a second production facility which is adapted to perform a respective second processing step with the object. The production data comprises production data for the second processing step, in particular for controlling the second production facility accordingly. The production monitoring unit can then be adapted to check an object production state of the object after applying the first processing step, wherein second actual property data of the object in-line of the production after applying the first processing step and in-advance of applying the second processing step is obtained, second deviation data is generated by comparing the second actual property data with the production data for the second processing step, and the second deviation data is provided for performing the second production step with the second processing facility in second-deviation-adjusted manner. Original production data for the second processing step is adaptable for adapted controlling of the second processing facility based on the second deviation data. The production monitoring unit can be arranged in-between the first and the second processing facility for performing respective measurements.

Alternatively, there may be provided a second production monitoring unit embodied like the above-described production monitoring unit which is controlled to acquire respective second actual property data.

In particular, measurement with a production monitoring unit after e.g. a second processing step may be used to adapt processing with a first processing facility in sense of a pre-compensation of systematic errors which are affected by the second machine. The first processing step is performed in-advance of the second processing step.

In the consequence, the original production data for the second processing step can be adapted based on the second deviation data and can be stored as updated original production data for controlling successive processing cycles with the second processing facility.

Some embodiments of the invention also relate to a production monitoring unit for a manufacturing system having a production line, the production line comprising at least a first processing facility, the production monitoring unit being adapted to obtain actual property data of at least one object that is produced in the production line according to particular production data and to provide adjustment of the production based on the obtained values, the production data comprises nominal pre-processing object data.

The production monitoring unit, in particular a measuring device, is connectable with the first processing facility for exchange of data and comprises a monitoring functionality. The monitoring functionality is adapted to control generation of the actual property data of the object in-advance of applying a first processing step with the first processing facility by in-line determining of dimensional and/or functional data of measuring points of the object by means of the production monitoring unit. A deviation between the generated actual property data and the nominal pre-processing object data is derived and the production data is adapted based on the deviation for adapted processing of the object with the first processing facility.

In particular, throughout the entire application, functional data or properties may comprise defect information regarding e.g. cracks, scratches, porosity changes, delamination, coating errors or flaws and/or properties below the surface regarding cracks, homogeneity, porosity or delamination can be detected.

The production monitoring unit can comprise a coordinate measuring machine which comprises at least a support structure and a measuring probe.

Furthermore, the support structure can comprise at least one structural segment, a proximal end of the support structure being mounted pivotably about a base axis, the measuring probe can be arranged on a distal end of the support structure, and the coordinate measuring machine can comprise an angle measuring system for determining pivot angles of the at least one structural segment, and/or rotation angles of the measuring probe.

In particular, the coordinate measuring machine can comprise at least two basically parallel rotational axes, in particular wherein structural segments of the support structure are rotatable around the axes, in particular wherein the coordinate measuring machine comprises a translational axis arranged basically collinear with one of the rotational axes, in particular wherein the rotational axes are aligned basically parallel to the gravitational field.

The coordinate measuring machine can also be embodied as a Selective-Compliance-Articulated-Robot-Arm-Type (SCARA-Type) measuring machine, in particular parallel SCARA-Type measuring machine.

According to one embodiment of the invention, the monitoring functionality is configured so that the object production state is, in particular periodically, checked by measuring particular measuring points of the object by in-line approaching the measuring probe to the object during production of the object by the production line.

Some embodiments of the invention also relate to a use of a production monitoring unit as described above or below in a production line with at least a first and in particular a second processing facility. The production monitoring unit here is connected with at least the first processing facility for communication and/or exchange of data and is arranged so that the actual property data of the object is determinable as dimensional or functional data of measuring points of the object by a measuring probe of the production monitoring unit in-line and in-advance of applying a first processing step with the first processing facility and before processing with the first respectively a second processing facility. The first processing step may be performed after a pre-processing step which can be performed also on the production line or separated from the production line.

The monitoring functionality is executed after processing the object with a further (e.g. a processing facility with which the object is processed before being introduced in the production line (pre-processing), i.e. the further processing facility may not be part of the production line; alternatively the further processing facility may be part of the production line as a pre-first-processing machine) or the first processing facility, the deviation between the generated actual property data and respective nominal pre-processing or processing object data is provided to the first respectively the second processing facility or adapted production data is derived based on the deviation and is provided to the first respectively the second processing facility, and the object is processed in the first respectively the second processing step by means of the first respectively the second processing facility by processing the deviation information or by use of the adapted controlling date.

Some embodiments of the invention also relate to a method for controlling a production process of an object in a production line and for compensating deviations occurring in the production process. The method comprises generating actual property data of at least one sample object by measuring the object during in-line production of the object, the object being processed in a first processing step, performing a nominal-actual value comparison based on the actual property data and on corresponding nominal production data for the object, thereby generating deviation data. Adapted production data for a second processing step of the production process is automatically created based on the deviation data, and an adapted second processing step is performed based on the adapted production data and processing the object in an adapted manner, wherein the adapted production data differs from a nominal production data so that a deviation occurring in the first processing step is at least partially compensated with applying the adapted second processing step.

According to a further aspect of the invention, a self-monitoring manufacturing system adapted to produce at least one object, in particular a series of objects, comprises at least one processing machine having at least one processing tool, the processing machine being controllable to perform a processing step with the object, and a production control unit having means for storing and/or obtaining production data for the processing step and being adapted to control the processing step of the processing machine based on the production data.

A production monitoring unit being arranged and adapted to in-line obtain actual processing data relating to the processing step. The data is obtained by measuring a test object processed with the processing machine in a working volume of the processing machine, wherein the test object is located in a defined position and orientation during measurement, and/or by measuring at least one structural component of the processing machine and/or an artefact fixed at a certain position of the processing machine. The self-monitoring manufacturing comprises a compensation unit for compensating deviations possibly occurring with applying the processing step (or other further processing steps) with the object. The compensation unit is adapted to compare the actual processing data with nominal processing data, to derive deviation data based on the comparison of the actual processing data with the nominal processing data, and to provide and/or process the deviation data for adapting the processing step and/or the manufacturing system.

The test object may be represented by one object of a series of such objects to be produced.

The nominal processing data preferably comprises information about nominal physical and/or nominal functional properties of the processing machine and/or the processing tool, in particular relative orientations and/or positions of machine axes or base, and/or course of travel information, and/or comprises a model of the test object to be processed by the processing machine comprising nominal dimensional values and/or nominal functional data of the test object, and/or comprises a machine model or map providing an actual state of the processing machine using a model-based or map-based calculation.

The actual processing data preferably comprises positional and/or orientation data relating to the structural component of the processing machine, the artefact or the test object, and/or functional data, in particular temperature, humidity and/or roughness data, related to the structural component of the processing machine, the artefact or the test object.

According to an embodiment of the invention, the production monitoring unit is adapted to conduct the measurement of the at least one structural component of the processing machine and/or of the artefact fixed at a certain position of the processing machine in a plurality of positions and/or orientations or the structural component or the artefact, in particular wherein the plurality of positions and/or orientations are provided by means of the processing machine and the processing machine is controlled by the production control unit accordingly.

A measurement of at least a part of the processing machine may comprises a direct measurement of the processing tool at the processing machine in-line after performing of the processing step, wherein a measuring probe of the production monitoring unit reaches into and is guided inside of the working volume by means of the production monitoring unit.

Alternatively or additionally, measuring of at least a part of the processing machine may comprise a coordinate and/or orientation measurement of a joint or axis of the processing machine.

As already described above, the production monitoring unit can be embodied as a coordinate measuring machine which comprises at least a support structure and a measuring probe.

In particular, the support structure comprises at least one structural segment, a proximal end of the support structure being mounted pivotably about a base axis, the measuring probe is arranged on a distal end of the support structure, and the coordinate measuring machine comprises an angle measuring system for determining pivot angles of the at least one structural segment, and/or rotation angles of the measuring probe.

In one embodiment the coordinate measuring machine comprises at least two basically parallel rotational axes, in particular wherein structural segments of the support structure are rotatable around the axes, in particular wherein the coordinate measuring machine comprises a translational axis arranged basically collinear with one of the rotational axes, in particular wherein the rotational axes are aligned basically parallel to the gravitational field.

The coordinate measuring machine can be embodied as a Selective-Compliance-Articulated-Robot-Arm-Type (SCARA-Type) measuring machine, in particular parallel SCARA-Type measuring machine.

According to an embodiment of the invention, the production monitoring unit is arranged at least basically structurally and dynamically decoupled from the processing machine.

According to one embodiment of the invention, the test object is processed in a defined production position and orientation within the working volume and is fixedly arranged to the production position and orientation during measurement.

That aspect also relates to a production monitoring unit, in particular coordinate measuring machine, for determining at least dimensional and/or functional data for a measurement point of an object or structural component of a processing machine. The production monitoring unit comprises a support structure having at least one structural segment, a proximal end of the support structure being mounted pivotably about a base axis, a measuring probe being arranged on a distal end of the support structure, and an angle measuring system for determining pivot angles of the at least one structural segment, and/or rotation angles of the measuring probe.

According to the invention, the production monitoring unit comprises a compensation unit for compensating a deviation possibly occurring in the course of a production of an object in at least one processing step with the processing machine. The compensation unit comprises a monitoring functionality by execution of which actual processing data relating to the at least one processing step is obtained in-line of the production by measuring a test object processed with the processing machine in a working volume of the processing machine, wherein the test object is located in a defined position and orientation during measurement, and/or by measuring at least one structural component of the processing machine and/or an artefact fixed at a certain position of the processing machine. The actual processing data is compared with nominal processing data, and deviation data is derived based on the comparison of the actual processing data with the nominal processing data, wherein the error compensation unit comprises a communication interface for exchange of data and wherein the deviation data is provided to the communication interface.

The production monitoring unit can be embodied as a coordinate measuring machine and may comprises at least a support structure and a measuring probe, in particular the production monitoring unit is embodied as a Selective-Compliance-Articulated-Robot-Arm-Type (SCARA-Type) measuring machine, in particular parallel SCARA-Type measuring machine.

According to particular embodiments of the invention, the production monitoring unit can be embodied as already described above.

In one embodiment, the monitoring functionality is configured so that the actual processing data is periodically obtained by periodically measuring particular measuring points at the test object, wherein the test object is periodically produced, and/or by periodically measuring at the at least one structural component and/or one or more artefacts fixed on the processing machine.

The production monitoring unit can be arranged at least basically structurally and dynamically decoupled from the first and the second processing facility.

A base of the production monitoring unit can be arranged at a ceiling of a manufacturing site, i.e. above the production line in order to provide optimised accessibility to the production machine or the test object.

The invention also refers to use of a production monitoring unit of above in a production assembly with the at least one processing machine.

The production monitoring unit here is arranged so that a measuring probe of the production monitoring unit is controllable for in-line obtaining the actual processing data relating to the processing step. The processing data is obtained by measuring the test object processed with the processing machine in the working volume of the processing machine, wherein the test object is located in a defined position and orientation during measurement, or by measuring at least one structural component of the processing machine and/or an artefact fixed at a certain position of the processing machine. The error compensation unit is connected with a controlling unit of the production assembly via the communication interface for communication and/or exchange of data. The monitoring functionality is executed, the deviation data is provided to the controlling unit for adapted controlling of the processing step and the controlling of the processing step is adapted based on the deviation data so that original controlling data for the processing step is adapted to provide production of the object according to original object production data, in particular according to an original model of the object, and/or an adjustment of the production assembly is provided.

Some embodiments of the invention also relate to a respective method for monitoring a production process step of an object and for compensating deviations occurring in the production process. The method comprises obtaining actual processing data in-line of the production process relating to the production process by measuring a test object processed with a processing machine in a working volume of the processing machine, wherein the test object is located in a defined production position and orientation during measurement, or by measuring at least one structural component of the processing machine and/or an artefact fixed at a certain position of the processing machine. The actual processing data is compared with nominal processing data, deviation data based on the comparison of the actual processing data with the nominal processing data is derived and provided and the production process is adapted based on the deviation data so that original controlling data of the processing machine is adapted to provide production of the object according to original object production data, in particular according to an original model of the object and/or an (structural) adjustment of the production assembly is provided.

In particular, an adapted production model is automatically created based on the nominal processing data and on the deviation data, wherein the adapted production model represents updated nominal processing data.

BRIEF SUMMARY OF THE DRAWINGS

The system and the method according to the invention are described or explained in more detail below, purely by way of example, with reference to working examples shown schematically in the drawings. Specifically.

DETAILED DESCRIPTION

Figure 1:
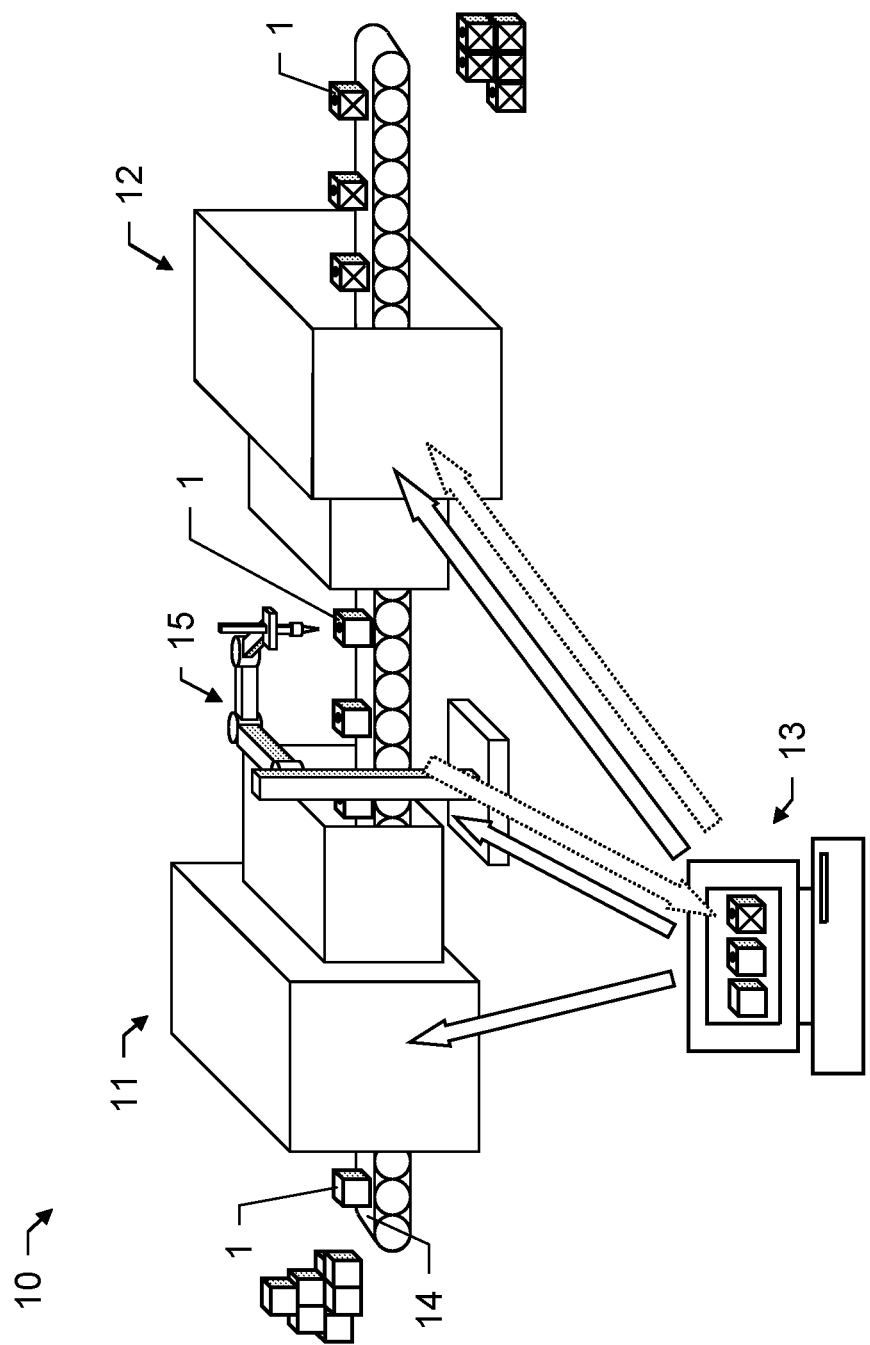
FIG. 1 shows an embodiment of a system for controlling a production process of an object according to the invention.

FIG. 1 illustrates an exemplary system for controlling a production process of an object 1 according to the invention.

FIG. 1 shows a production line 10 with two processing facilities 11 and 12. The processing facilities 11 and 12 are controlled by a controlling unit 13 which provides respective processing or production data for performing a first and a second processing step correspondingly. The object is supplied to the first processing facility 11 and the first production step is applied by that machine 11. After that, the object is transferred to the second processing machine 12 and the second production step is applied by means of the second machine 12. Here, the object 1 is finished after being processed by the second machine 12. Alternatively, the second machine 12 applies a further intermediate processing step and the object 1 may be further processed and/or finished by another machine.

It is to be understood in the scope of the present invention that an alternative embodiment (not shown) would be one comprising the second processing facility 12 as a first processing device in the production line and the objects being inserted onto the production line in advance of such processing.

A main requirement of the production process according to FIG. 1 is that the object is finally produced according to defined nominal object data, in particular according to a defined model of the object. The object data may comprise specific tolerance values for the object 1. E.g. nominal data and tolerances for one processing step might be deduced from a primary source of information (e.g. 2D-drawings or 3D geometrical representation of the object 1 or a combination thereof). For instance, with the first processing step there is applied some processing agent on at the object 1. The second processing step will be adapted accordingly, i.e. according to a thickness of the applied agent.

However, there may occur the problem of producing the object 1 with significant dimensional deviation already by performing the first processing step. Such production error would typically be transferred into the second processing step and result in global deviations of the final object. According to the invention, there is provided a production monitoring unit 15 for periodically checking an object production state of the object 1 relating to the first processing step of the first processing facility 11. Such unit 15 is arranged so that an object which was processed with the first processing machine 11 is transferred into the measuring volume of the monitoring unit 15. For example, as shown here, the object 1 is transported on a conveying belt 14 and the monitoring unit 15, in particular a sensing probe of the monitoring unit 15, is designed to approach (and touch) the object 1 for measuring the object (tactile or optical) while the object 1 is moved by the belt 14 (in-line).

Alternatively, the object 1 can be transported—e.g. by means of the monitoring unit 15—and located on a separate basis and measured while located on that basis. After conducting the measurement the object 1 would be provided for the second processing step. The monitoring unit 15 can be arranged structurally separated from the first and/or the second processing machine.

Alternatively, the object 1 can be carried by means of the monitoring unit 15 and guided towards or along a respective probe to provide measurement of the object 1.

Hence, the production monitoring unit 15 enables to derive values of properties of the object 1 after performance of the first processing step. Actual property data can be gathered that way. Such data can be represented by coordinates of the object 1 which can be determined by the monitoring unit 1. Besides geometrical properties, the data can also be represented by functional properties. Properties like roughness, hardness or temperature may be derived for that, in particular by non-destructive testing of the object 1.

Inspection of the object according to the invention can also be provided in advance of the first processing step in order to gather information about the object's state for such first processing and to adjust the first processing step respectively.

In particular, the monitoring unit 15 is designed as or comprises a coordinate measuring machine as shown. The coordinate measuring machine (CMM) may be of the SCARA-type (Selective-Compliance-Articulated-Robot-Arm). Such design has the big advantage that a measuring probe which is mounted at a distal end of the CMM can be moved and positioned inside a working volume of the production line 10 and the object 1 can be measured over a comparatively wide measuring volume.

The SCARA-type CMM may be designed comprising at least two basically parallel rotational axes. Respective machine components are rotatable around those axes. In particular, the SCARA may further comprise a translational axis arranged basically collinear with one of the rotational axes. According to a specific embodiment, the rotational axes are aligned basically along (parallel) the gravitational field. Such design enables to move a probe which is arranged at a distal end of the structural chain within a comparatively large measuring volume.

A further advantage is that the CMM 15 does not have to be structurally integrated into the production line 10 but can be positioned decoupled of the production line 10 and the measuring probe can be guided to reach into the working volume of the production line 10. By that, vibrations or deformation effects caused by the production line 10, i.e. by the production facilities 11,12, do not influence coordinate measurements of the CMM 15.

A further advantage would be the possibility to arrange a reference body (e.g. corresponding to an object to be produced) within an additional measuring volume which is near the structural basis of the SCARA. This enables to provide consecutive reference measurements by means of the reference body. An alignment of the reference body may basically correspond to respective alignments of objects to be produced e.g. on the conveying belt.

A further advantage would be a reduction of machine downtimes due to the possibility of measuring in-line, i.e. basically without interrupting the production process.

Yet another advantage is that by use of measuring data and adapting subsequent production processes based on that data objects can be produced as first built, i.e. adjustments of the production process can be avoided or reduced.

The actual property data further provides a comparison of such data with production data for the first processing step. In other words, the actual data can be compared with nominal data for the object 1, wherein the nominal data for the object 1 comprises nominal (desired) values for the object 1 after being processed with the first processing machine 11 (e.g. a digital model (e.g. CAD-model) of the object 1). A deviation is derived based on that comparison of actual and nominal data. By use of an in-line measurement different objects may be produced with the same production line 10, wherein production of those differing objects can be monitored by use of respective nominal data for those objects.

The actual property data may be directly transmitted to the controlling unit 13 or respective deviation data may be generated on side of the CMM 15 and afterwards transmitted to the controlling unit 13.

Based on the deviation between a nominal state of the object 1 after first processing step and the (real) actual state of it, a second processing step to be performed with the second processing facility 12 is adapted in a way such that the property data of the final produced object comprises reduced deviation (dimensional deviations or defects etc.) between respective nominal final-object data and the actual property data of the object after being processed by the second processing facility 12. In other words, the second processing step (respectively the first processing step if inspecting the object before the first step) can be adapted to compensate errors occurring by performing the first processing step by use of measuring data which is provided by the monitoring unit 15.

In particular, the second processing machine 12 provides a compensation-processing based on the gathered measurement data, wherein the second processing machine 12 comprises similar or identical processing tools compared to the first processing machine 11.

A kind of adapted production data is generated. The adapted production data is used to control the second production facility 12 in an adapted way. This means that original production data for the second processing step is adapted for adapted controlling of the second processing facility based on the deviation data.

The second processing facility 12 is controlled based on the adapted production data for the second processing step in a manner such that the deviation between the actual property data and the production data for the first processing step is compensated so that thereof expected deviation between actual property data relating to the object after performing the original second processing step and original production data for the second processing step is reduced or eliminated.

Moreover, the processing machine which receives data for adjusting its processing program can provide further processing of the object so that the object's properties are within tolerances for the object. This can also be the case if the object properties are out of tolerance before a successive processing step. By means of particular adaptation of the processing program respective parts of the object can be manipulated to again meet nominal object data (considering defined tolerances).

The adapted production data may be generated by the controlling unit 13 and transmitted to the second processing facility 12. Alternatively, the deviation data is transmitted from the controlling unit 13 to the processing facility 12. Alternatively, the actual property data or the deviation data is directly transmitted to the second processing facility 12 and the second processing step is adapted based thereon by respective processing of such data on side of the second processing facility 12.

Moreover, the controlling unit 13 can provide respective object data for the monitoring unit 15 in order to enable adequate measuring of the objects 1 which are processed by the first processing facility 11, in particular of defined measuring points at the objects 1. Alternatively, the object data may directly provided by the first processing facility 11.

Figure 2A:
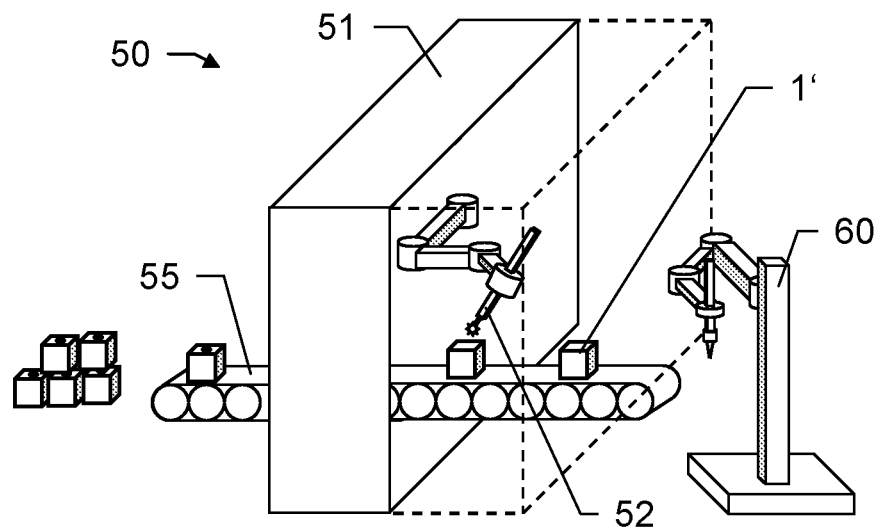
FIGS. 2a-b show an embodiment of compensating production errors possibly occurring in a production assembly according to the invention.
Figure 2B:
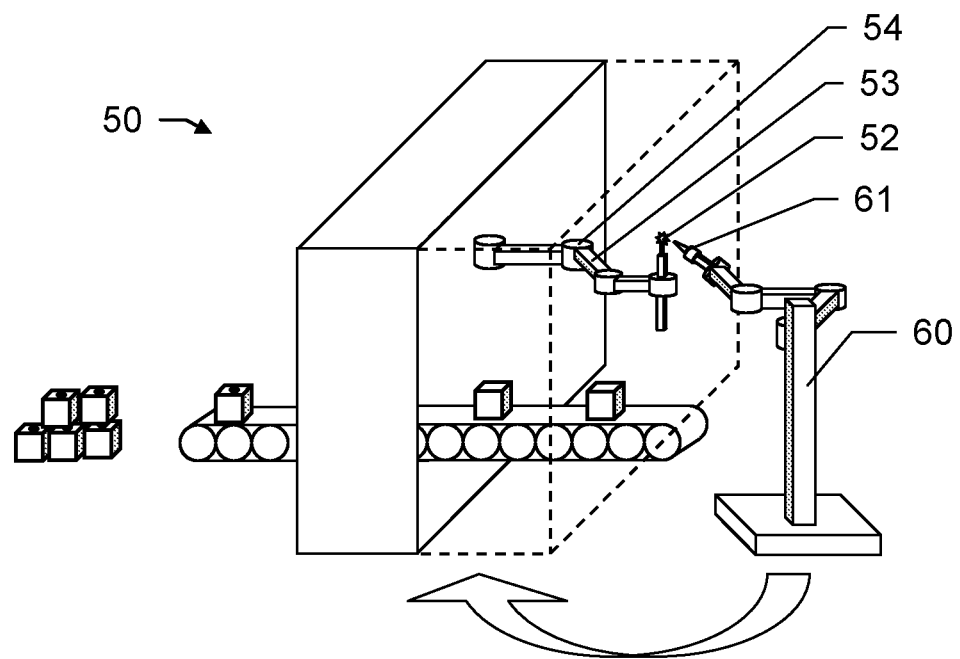

FIGS. 2a and 2b illustrate an embodiment of compensating production errors occurring in a production assembly 50 according to the invention.

The production assembly 50 comprises a processing machine 51 for processing workpieces and an inspection unit here being embodied as a coordinate measuring machine 60 for measuring physical properties of a workpiece or of at least a part of the processing machine 51 in order to monitor a production process.

FIG. 2a shows the assembly 50 in a production mode, i.e. the working tool 52 is processing one of the objects 1' to be manipulated and the coordinate measuring machine 60 is in a resting position. A production model might be switched during the assembly process of one unit, before the overall task is completed, allowing the inspection unit 60 to get intermediate inspection data—which later can be used to adapt the processing unit.

Due to such processing of e.g. multiple objects over a period of time a number of errors or deviations can occur within the production process. For example, there may be a (temperature) drift of some of the machine parts of the processing machine 51 or dimensions or quality (precision) of the processing tool 52 may change caused by abrasion during processing an object or the parts to be assembled may vary significantly during production. Each such influence on the production process leads to lower product quality of the object.

According to the invention the monitoring unit 60, i.e. here the coordinate measuring machine 60, is provided in order to monitor the production process periodically, e.g. during and/or after processing a defined number of objects 1' or after a defined production period. The production process or part of the production process can be adjusted based on data generated by the monitoring unit 60. Measurements by means of the monitoring unit 60 may be performed in real-time during the processing and an adjustment of processing may respectively applied also in real-time.

In particular, the inspection unit 60 comprises a laser interferometer based system (absolute or relative) and/or a tracking system (laser tracker) to derive respective positions of measuring points. Alternatively a camera based triangulation system can be used.

As shown in FIG. 2b the processing machine 51 can be controlled to bring the working tool 52 of the machine 51 in at least one certain check-position. For providing such position, respective structural components like joints 54 and frame elements 53 of the processing machine 51 are set in a particular or arbitrary state which may be observed by the processing machine 51 and transferred to the inspection unit 60. Here, the arm of the manipulation tool (arm) is extended to reach in a direction towards the CMM 60.

In parallel, the coordinate measuring machine 60 is controlled to measure at least a part of the processing machine 51, in particular to measure the working tool 52. The measuring probe 61 of the CMM 60 is guided to approach the processing tool 52 and to determine coordinate information relating to particular measuring points at the tool 52. Besides geometrical coordinate properties, the data can also be represented by functional properties. Properties like roughness, hardness or temperature may be derived for that, in particular by non-destructive testing of a respective machine part. Such tool 52 may be embodied as a cutting, milling or welding tool or as a tool for additive processing like a tool for injection molding or the like. Gathered coordinate or state information represents particular actual processing data which is related to an actual state of the processing machine 51. Those actual processing data can then be compared with respective nominal processing data related to a nominal (reference) state of the machine 51, in particular with a nominal tool state which describes dimensions of the tool in a condition as delivered or as originally manufactured or as preliminary calibrated or as determined during the last inspection.

Alternatively or additionally, not only the tool 52 of the processing machine 51 is measured but other machine parts are subject to respective measurements, in particular at a number (plurality) of different positions. E.g. a joint may be measured by means of the CMM 60.

Process information (deviations, errors, thermal influences, vibrations etc.) is derived based on the comparison of the actual processing data with the nominal processing data. Such process information comprises information about the quality of processing the object 1' with a processing tool of the actual processing data. In other words, based on such information there can be an estimate about how the object is processed, i.e. about resulting dimensions and precision or the changes thereof.

The process information is provided to the production assembly 50 (e.g. to a respective controlling unit), in particular to the processing machine 51. Information can be transmitted wirelessly by radio signal, Bluetooth, WiFi or the like or by cable.

In a next step, the production process is adapted based on the process information, i.e. controlling of the processing machine is adapted respectively. By that, the movement and/or processing parameters of the processing tool 52 are adapted to process the object in adapted manner such that expected deviations (or the like) due to the determined deviation are reduced or compensated (avoided) by the adapted processing. For instance, if a milling tool comprises significant abrasions which are identified by a coordinate measurement at the tool, the processing of the object 1' is controlled so that the tool 52 is approached to the object 1' closer, wherein the same result is generated compared to a processing with a nominal tool which is approached to the object 1' in normal manner, i.e. not that close.

Hence, the original controlling data of the processing machine is adapted to provide production of the object which corresponds to desired object production data, in particular corresponds to a desired model of the object.

By performing above steps, there is provided a method for in particular self-compensating the production process according to actual deviations e.g. in the machine state. As a consequence, production of the object is more reliable over a larger period of time. A further advantage is that the processing tool can be used for processing more objects and does not have to be exchanged as often.

The conveying belt 55 of the processing assembly 50 is preferably stopped or driven with less speed during coordinate measurement.

Figure 3A:
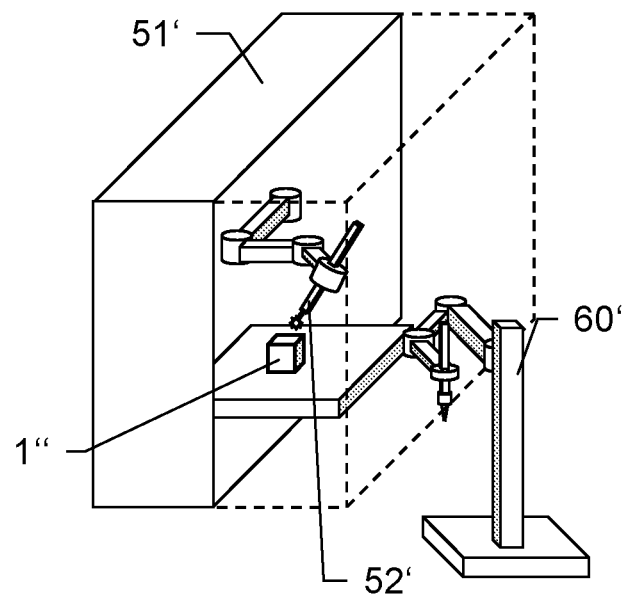
FIGS. 3a-b show a further embodiment of a production system according to the invention.
Figure 3B:
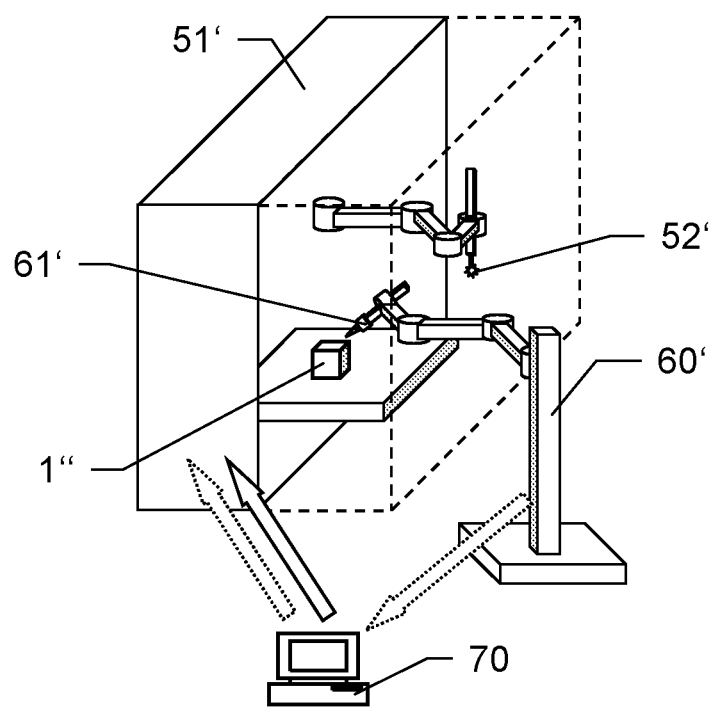

According to an alternative embodiment of the invention, illustrated with FIGS. 3a and 3b, the processing machine 51' is controlled to at least partially produce a test/reference object 1" according to known reference (test) object production data. Such reference object may correspond to an object of an actual production process. After production or processing of such object 1", the object 1" is kept in its original processing position and orientation in the processing volume of the machine 51'. Alternatively, the object 1" can be relocated, wherein a new position and orientation is determined and/or well known. However, one requirement for that embodiment is that the object 1" remains in a fixed position while being processed and/or observed with the monitoring unit.

According to a specific embodiment, the position of the object 1" is changed during measuring the object 1". The change of position is provided by the processing machine. This allows to derive sequence errors related to the processing step.

As can be seen in FIG. 3b, the processing tool 52' is driven in at least one resting position after production of the reference object. The inspection unit, i.e. here a coordinate measuring machine 60', which is designed as a SCARA-type measuring machine having a robotic arm of several segments and joints for providing controlled positioning and orientating of the measuring probe 61' in six degrees of freedom (6-DOF), is controlled to measure at least a part of the reference object 1".

Nominal property data and a position and orientation of the reference object 1" in the processing volume at desired states are known.

Since the reference object 1" remains in its original production state, i.e. in certain production position and orientation, such measurement of the reference object 1" allows to derive respective actual processing data which also contains information about an actual machine state (in a more effective and precise way than possible with offline measurements). Based on measured property values of the object and as the object 1" was not moved for and during measuring a conclusion can be drawn about e.g. if and how machine axis of the processing machine 51' are correctly aligned or if there is any positional deviation of the axis.

Hence, a measurement of the object 1" allows deriving information about an actual state of the processing machine 51'.

For example, if on one side of the object there was milled-off more material from the object than was planned according to the processing data this could be a clear evidence that there is an error of positioning the processing 51 along a respective axis, in particular if the coordinate measurements identify a milling of the opposite side of the object in contrary manner, i.e. that there is not as much material subtracted as planned.

Error in a processing sequence can be derived on basis of measurements conduced at processing positions of the processed object 1" or on basis of measurements with a reference object at particular positions in the processing machine.

Data which is gathered by means of the coordinate measuring machine 60' is transmitted to a controlling unit 70. Such controlling unit 70 also comprises nominal processing data for producing the object 1". A comparison of those data sets can be provided by the controlling unit 70 and respective conclusions about the machine state can also be derived thereby (e.g. by processing or calculating, in particular based on a model or other machine data which describe particular parameters of the processing machine 51').

In a next step, the production data for producing further objects, which may differ from the reference object, and/or continue the processing of the reference object is adapted based on the derived machine state. The processing is adjusted so that machine or tool errors are compensated by changing particular controlling parameters for e.g. driving the machine axis in different way. As a result, the objects to be processed comprise physical properties which preferably correspond to nominal production data for the objects after processing with an adapted processing program, however at least comprise physical properties which have less deviation compared with nominal production data than before adapting the processing program.

Alternatively, deviations resulting from processing related to the test/reference object 1" are used to initiate and adjust further processing of the reference object 1" by means of the processing machine 51'. In other words, the reference object 1" is processed according to nominal processing data and measured afterwards. In a next step potential (dimensional and/or functional) deviations are derived by measurements performed with the inspection unit 60' and a next processing step is adjusted and controlled based on the deviations. The next processing step thus is designed so that deviations emerging from the foregoing step are compensated or reduced.

According to other embodiments of the invention other or additional actions may be initiated based on the gathered measurement and deviation data. Maintenance or exchange of the processing tool 52' can be planned or conducted based on a derived state of the processing tool 52'. In particular, a schedule can be generated or adjusted for such maintenance or exchange. Furthermore, maintenance or exchange of specific components of the machine 51' could be planned or initiated (statistical data derived based on a series of measurements and/or a respective model can also be considered for that). Even more, an exchange of the entire processing unit 51' may be initiated or planned. Alternatively, the process of production of the objects 1" may be stopped due to gathered measuring data. A further or alternative aspect is that a larger number of measurements are initiated in order to derive the state of the object 1" more precisely. Such could help to monitor potential changes in the processing system.

The use of the controlling unit 70 is optional. Alternatively, data gathered with the CMM 60' may directly be transmitted to the processing machine 51' and further processed on the machine side or may be processed with a controlling unit directly on the CMM 60' and an adapted production program is transmitted from the CMM 60' to the processing machine 51'. A respective controlling unit also may comprise nominal machine and nominal object data for further processing of the measuring data.

According to another aspect of the invention, the reference object may be represented by a defined and well known artefact. Such artefact or a plurality of such artefacts is/are placed in the working volume of the processing machine at known position and orientation. The artefact is designed so that based on a measurement at a particular measuring point there can be derived some information about the state of a machine component the artefact is attached to. This allows separating tool-related errors from machine-related errors.

By use a specific tool or probe head the object to be measured can be cleaned or washed in advance of measuring that respective object. By that, possible contaminations of the object can be removed and measurements become more precise and reliable.

What is claimed is:

1. A production monitoring unit for determining at least dimensional or functional data for a measurement point of an object or structural component of a processing machine, the production monitoring unit comprising:
    a support structure having at least one structural segment, a proximal end of the support structure being mounted pivotably about a base axis;
    a measuring probe being arranged on a distal end of the support structure;
    an angle measuring system configured for determining pivot angles of the at least one structural segment or rotation angles of the measuring probe; and
    a compensation unit configured for compensating a deviation occurring in the course of a production of a processed object from a pre-processed object in at least one processing step with the processing machine, the compensation unit including a monitoring functionality by execution of which:
        actual processing data relating to the at least one processing step is obtained in-line of the production by:
            measuring a test object processed with the processing machine from the pre-processed object in a working volume of the processing machine, wherein the test object is located in a defined position and orientation during measurement, or
            measuring at least one structural component of the processing machine or an artefact fixed at a certain position of the processing machine,
        the actual processing data is compared with nominal processing data, and
        deviation data is derived based on the comparison of the actual processing data with the nominal processing data,
        wherein the compensation unit comprises a communication interface for exchange of data and wherein the deviation data is provided to the communication interface.

2. The production monitoring unit according to claim 1, wherein the production monitoring unit comprises or is embodied as a coordinate measuring machine and comprises at least:
    a support structure, and
    a measuring probe.

3. The production monitoring unit according to claim 1, wherein the production monitoring unit is arranged so that a measuring probe of the production monitoring unit is controllable for in-line obtaining the actual processing data relating to the processing step by:
    measuring the test object processed with the processing machine in the working volume of the processing machine, wherein the test object is located in a defined position and orientation during measurement, or
    measuring at least one structural component of the processing machine or an artefact fixed at a certain position of the processing machine,
    wherein:
        the compensation unit is connected with a controlling unit of the production assembly via the communication interface for communication or exchange of data,
        the deviation data is provided to the controlling unit for adapted controlling of the processing step, and
        the controlling of the processing step is adapted based on the deviation data such that original controlling data for the processing step is adapted to provide production of the processed object according to original object production data or an adjustment of the production assembly is provided.

4. The production monitoring unit according to claim 2, wherein the coordinate measuring machine comprises at least two basically parallel rotational axes.

5. The production monitoring unit according to claim 1, wherein the monitoring functionality is configured so that the actual processing data is periodically obtained:
    by periodically measuring particular measuring points at the test object, wherein the test object is periodically produced, or
    by periodically measuring at the at least one structural component or one or more artefacts fixed on the processing machine.

6. The production monitoring unit according to claim 1, wherein a base of the production monitoring unit is arranged at a ceiling of a manufacturing site.

7. A method for monitoring a production process step of an object and compensating for deviations occurring in the production process, the method comprising:
    obtaining actual processing data in-line of the production process relating to the production process by:
        measuring a test object processed with a processing machine from a pre-processed object in a working volume of the processing machine, wherein the test object is located in a defined production position and orientation during measurement, or
        measuring at least one structural component of the processing machine or an artefact fixed at a certain position of the processing machine, comparing the actual processing data with nominal processing data,
deriving and providing deviation data based on the comparison of the actual processing data with the nominal processing data and
adapting the production process based on the deviation data so that original controlling data of the processing machine is adapted to provide production of a processed object according to original object production data.

8. The method according to claim 7, wherein an adapted production model is automatically created based on the nominal processing data and on the deviation data, wherein the adapted production model represents updated nominal processing data.

9. A self-monitoring manufacturing system adapted to produce at least one processed object from at least one pre-processed object, the self-monitory manufacturing system comprising:
a means of a production line including:
at least a first processing facility which is adapted to perform a respective first processing step with a first pre-processed object to obtain a first processed object, and
a production control unit having means for storing or obtaining production data for the first processing step and being adapted to control the processing step based on the production data, wherein the production data comprises nominal pre-processing object data;
the production monitoring unit of claim 1 configured for checking a pre-processing object state of the first processed object, the production monitoring unit being configured to:
obtain actual property data of the object in-line of the production in-advance of applying the first processing step,
generate deviation data by comparing the actual property data with the production data for the first processing step, and
provide the deviation data for performing the first production step with the first processing facility in deviation-adjusted manner,
wherein:
original production data for the first processing step is adaptable for adapted controlling of the first processing facility based on the deviation data, and
the first processing facility is controllable based on the adapted production data for the first processing step in a manner such that the deviation between the actual property data and the nominal pre-processing object data is compensated so that expected deviation between actual property data relating to the processed object after performing the original first processing step and original production data for the first processing step is reduced.

10. The self-monitoring manufacturing system according to claim 9, wherein the production monitoring unit is arranged at least basically structurally and dynamically decoupled from the first and the second processing facility.

11. The self-monitoring manufacturing system according to claim 9, wherein the actual property data comprises: dimensional data or functional property data.

12. The self-monitoring manufacturing system according to claim 9, wherein the production monitoring unit is arranged at least basically structurally and dynamically decoupled from the processing facility, or a base of the production monitoring unit is arranged at a ceiling of a manufacturing site.

13. The self-monitoring manufacturing system according to claim 9, wherein the production monitoring unit comprises a coordinate measuring machine having at least:
a support structure, and
a measuring probe.

14. The self-monitoring manufacturing system according to claim 9, wherein the production data comprises:
a first object model which represents a nominal state of the pre-processed object for the first processing step according to the nominal pre-processing object data, and
a second object model which represents a nominal state of the processed object after applying the first processing step.

15. The self-monitoring manufacturing system according to claim 9, wherein the production line comprises another production facility which is adapted to perform the in-advance processing step with the processed object, wherein the further production facility is controllable by the production control unit.

16. The self-monitoring manufacturing system according to claim 9, wherein:
the production line comprises a second processing facility which is adapted to perform a respective second processing step with the processed object,
the production data comprises production data for the second processing step,
the production monitoring unit is adapted to check an object production state of the processed object after applying the first processing step,
second actual property data of the object in-line of the production after applying the first processing step and in-advance of applying the second processing step is obtained,
second deviation data is generated by comparing the second actual property data with the production data for the second processing step,
the second deviation data is provided for performing the second production step with the second processing facility in second-deviation-adjusted manner,
wherein original production data for the second processing step is adaptable for adapted controlling of the second processing facility based on the second deviation data.

17. The self-monitoring manufacturing system according to claim 9, wherein the monitoring functionality is configured so that the object production state is checked by measuring particular measuring points of the processed object by in-line approaching the measuring probe to the processed object during production of the processed object by the production line.

* * * * *